(12) United States Patent  (10) Patent No.: US 9,213,520 B2
Ohashi et al.                (45) Date of Patent:     Dec. 15, 2015

(54) LINKED DISPLAY SYSTEM, LINKED DISPLAY METHOD AND PROGRAM

(75) Inventors: Yoshinori Ohashi, Tokyo (JP); Eiju Yamada, Kanagawa (JP); Akihiko Kinoshita, Tokyo (JP)

(73) Assignee: Sony Corporation (JP)

( * ) Notice: Subject to any disclaimer, the term of this patent is extended or adjusted under 35 U.S.C. 154(b) by 205 days.

(21) Appl. No.: 13/516,907

(22) PCT Filed: Nov. 16, 2010

(86) PCT No.: PCT/JP2010/070378
§ 371 (c)(1),
(2), (4) Date: Jun. 18, 2012

(87) PCT Pub. No.: WO2011/077859
PCT Pub. Date: Jun. 30, 2011

(65) Prior Publication Data
US 2012/0262492 A1    Oct. 18, 2012

(30) Foreign Application Priority Data
Dec. 25, 2009 (JP) ................. 2009-296063

(51) Int. Cl.
G06F 3/0488    (2013.01)
G06F 3/14      (2006.01)
G01C 21/36     (2006.01)
G09B 29/00     (2006.01)
G09B 29/10     (2006.01)
G06F 17/30     (2006.01)

(52) U.S. Cl.
CPC ............ G06F 3/1454 (2013.01); G01C 21/367 (2013.01); G01C 21/3664 (2013.01);
(Continued)

(58) Field of Classification Search
CPC ..................... G06F 17/30061; G06F 19/26
See application file for complete search history.

(56) References Cited

U.S. PATENT DOCUMENTS

2003/0182052 A1* 9/2003 DeLorme et al. ............. 701/201
2009/0315913 A1* 12/2009 Nagashima et al. .......... 345/629
(Continued)

FOREIGN PATENT DOCUMENTS

JP    10-340045 A    12/1998
JP    2001-184315 A   7/2001
(Continued)

Primary Examiner — Phi Hoang
Assistant Examiner — Diane Wills
(74) Attorney, Agent, or Firm — Lerner, David, Littenberg, Krumholz & Mentlik, LLP

(57) ABSTRACT

Provided is a linked display system capable of improving availability of information having different scales and amounts of information, a linked display method, and a program. A mobile terminal 100 includes a display unit 101 that displays operation display information I1, a range setting unit 105 that sets a predetermined range A containing a specified position in accordance with an operation to specify any position P over operation display information and a communication unit 109 that transmits the predetermined range to a TV set 200. The TV set includes a communication unit 209 that receives the predetermined range from the mobile terminal, a display information selection unit 205 that selects reference display information I2 capable of displaying information corresponding to the predetermined range from at least one piece of the reference display information corresponding to the operation display information in accordance with display capacity of a local apparatus and having a different scale and amount of information from those of the operation display information, and a display unit 201 that displays information corresponding to the predetermined range of the selected reference display information.

8 Claims, 11 Drawing Sheets

(52) U.S. Cl.
CPC .......... *G01C21/3688* (2013.01); *G06F 3/1462* (2013.01); *G09B 29/003* (2013.01); *G09B 29/10* (2013.01); *G09B 29/106* (2013.01); *G06F 3/0488* (2013.01); *G06F 17/30061* (2013.01)

(56) References Cited

U.S. PATENT DOCUMENTS

| | | | |
|---|---|---|---|
| 2010/0049704 A1* | 2/2010 | Sumiya | 707/5 |
| 2010/0199213 A1* | 8/2010 | Suzuki | 715/784 |
| 2010/0235085 A1* | 9/2010 | Kikuchi | 715/784 |
| 2010/0269152 A1* | 10/2010 | Pahlavan et al. | 726/3 |
| 2011/0264370 A1* | 10/2011 | Jakobson et al. | 701/209 |

FOREIGN PATENT DOCUMENTS

| | | | |
|---|---|---|---|
| JP | 2001184315 A | * | 7/2001 |
| WO | 2008010365 A1 | | 1/2008 |

* cited by examiner

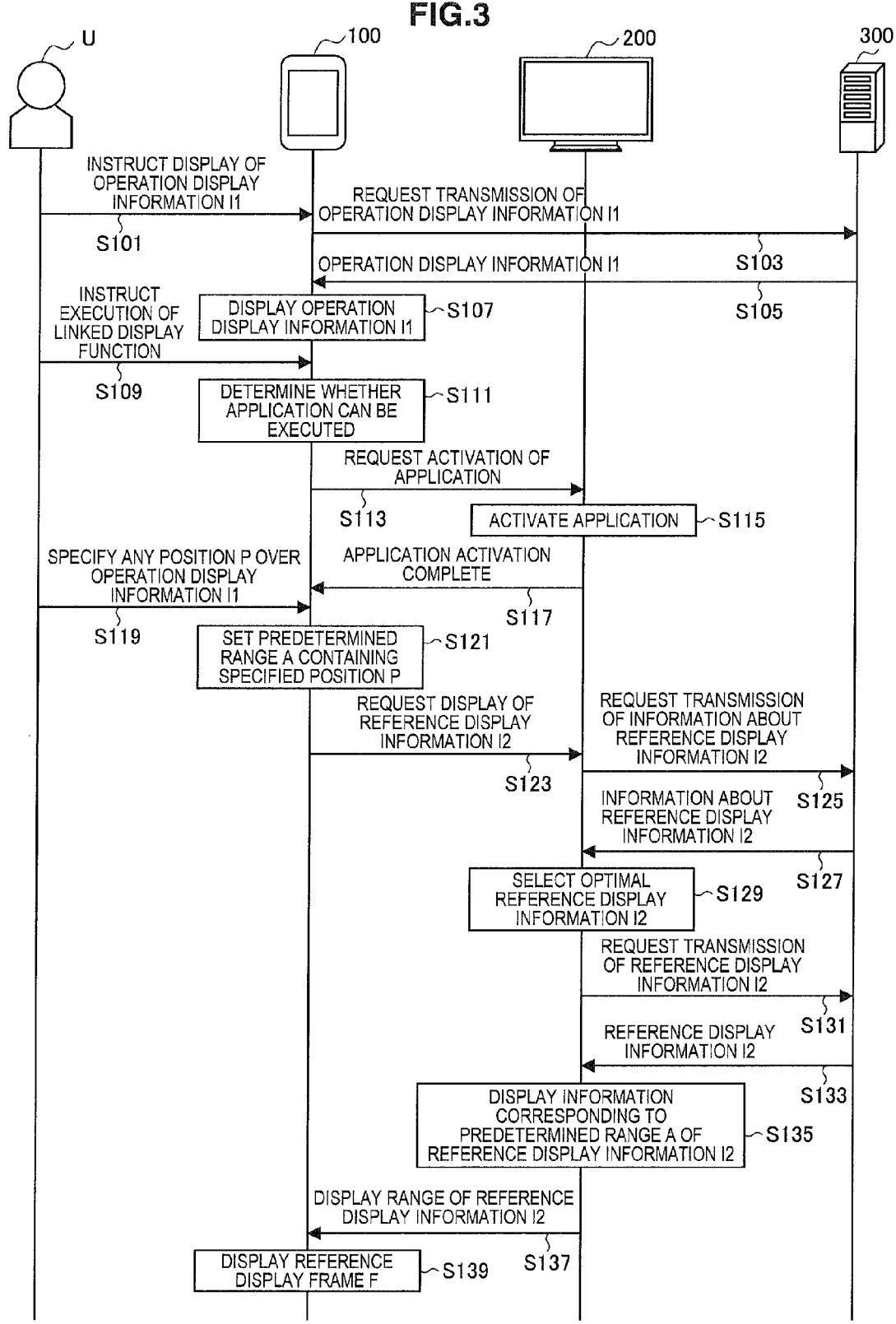

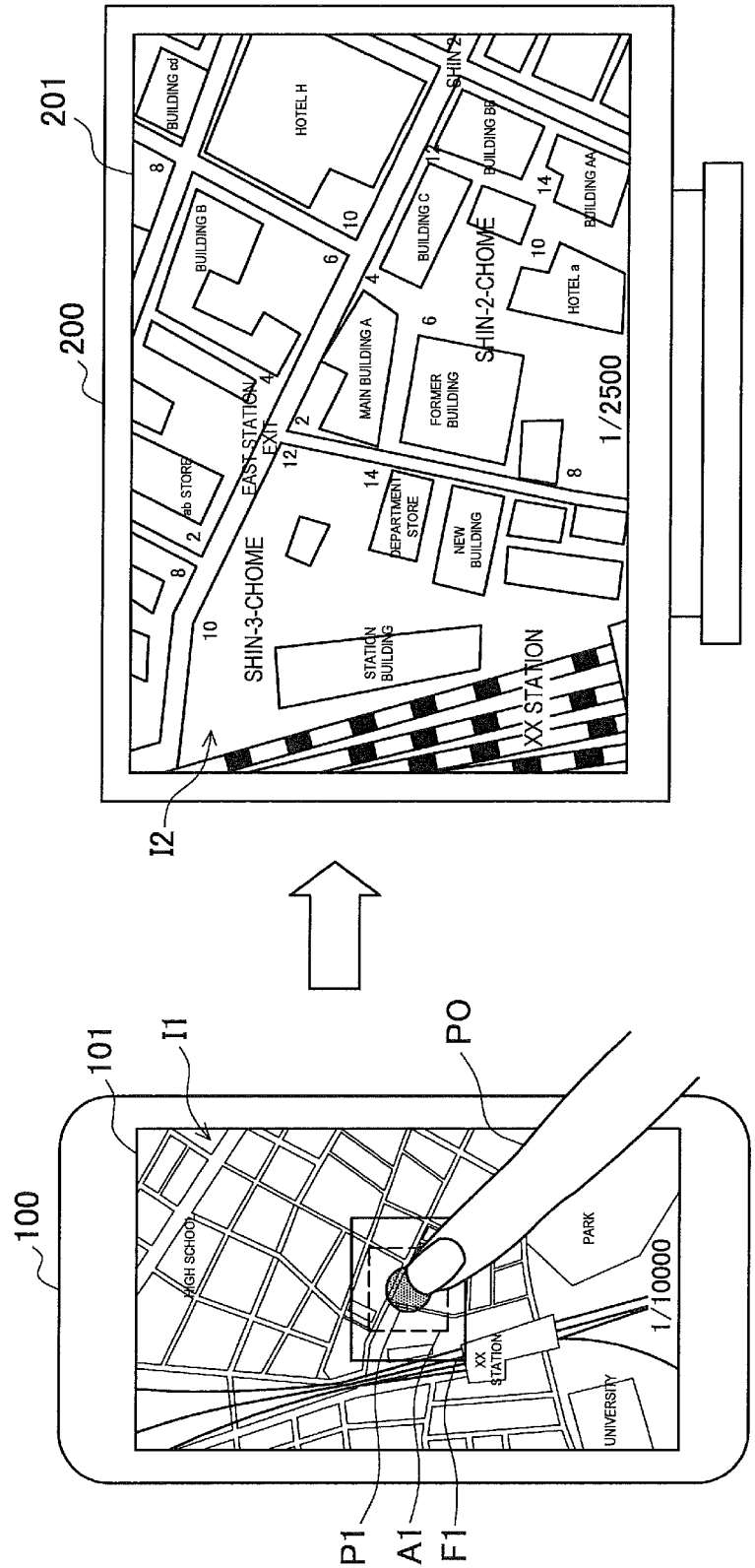

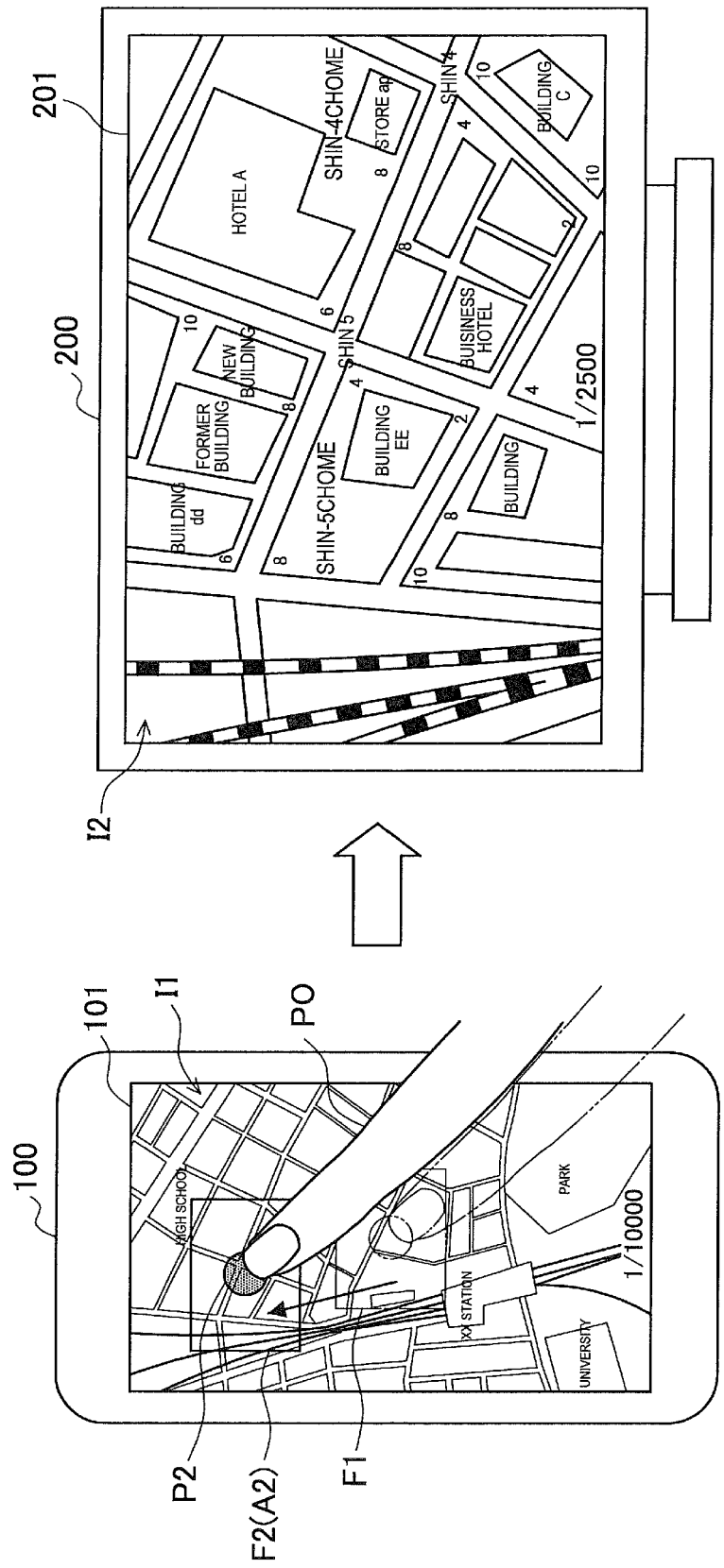

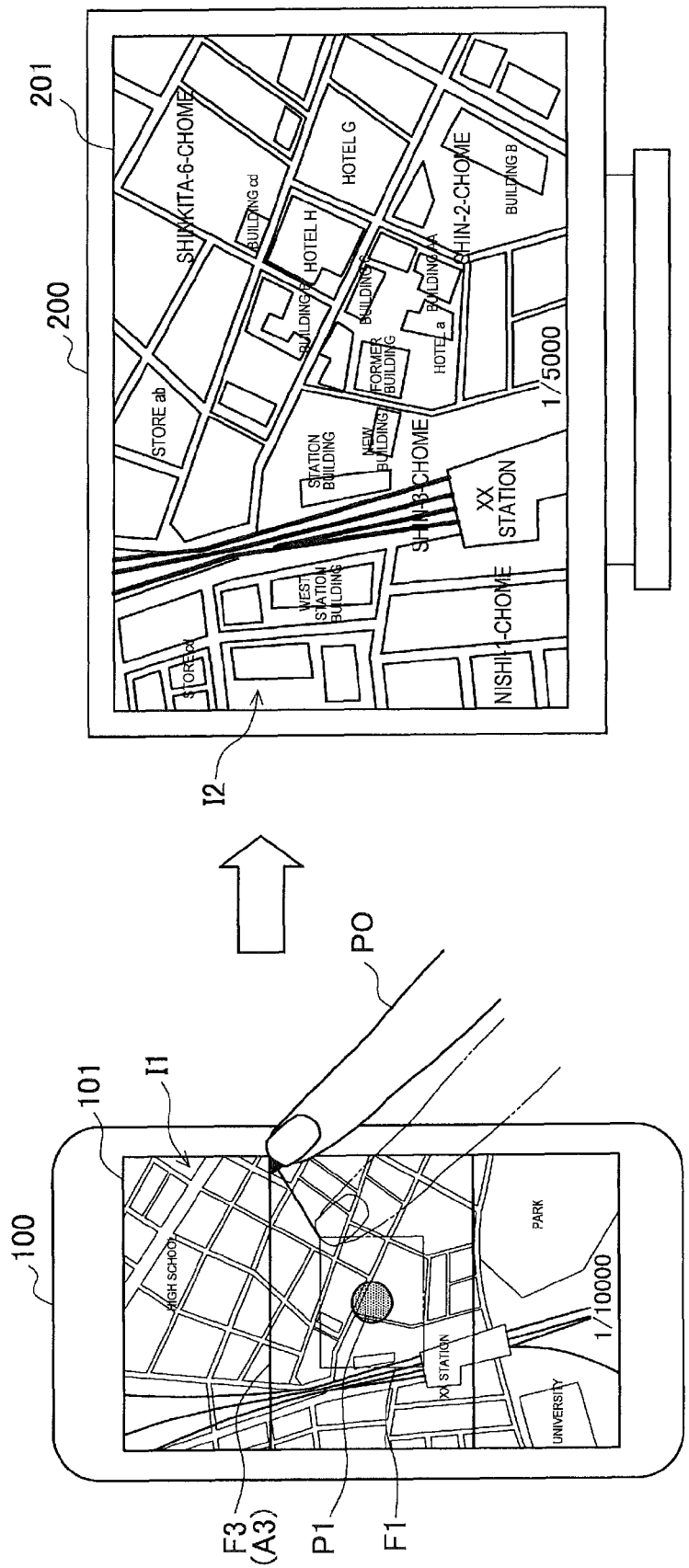

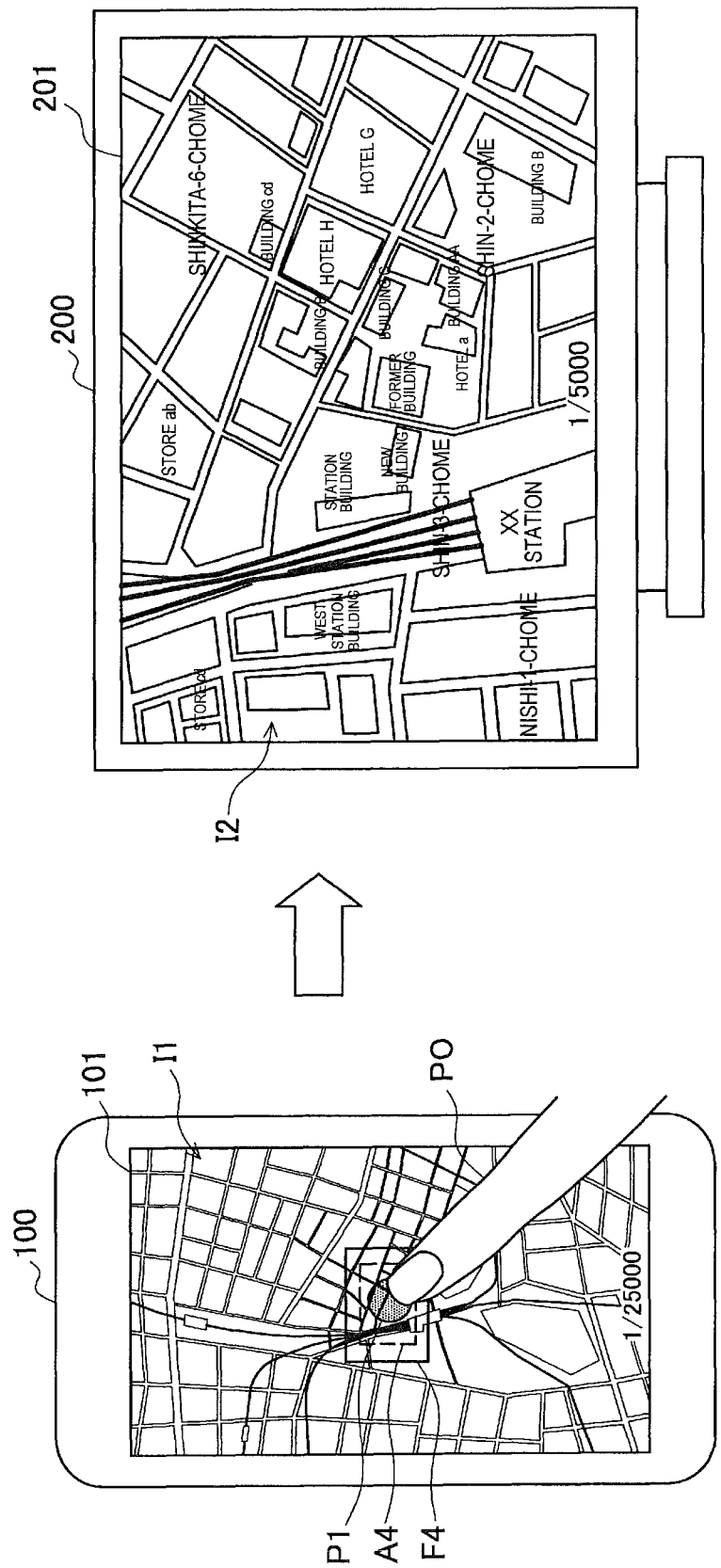

FIG.5
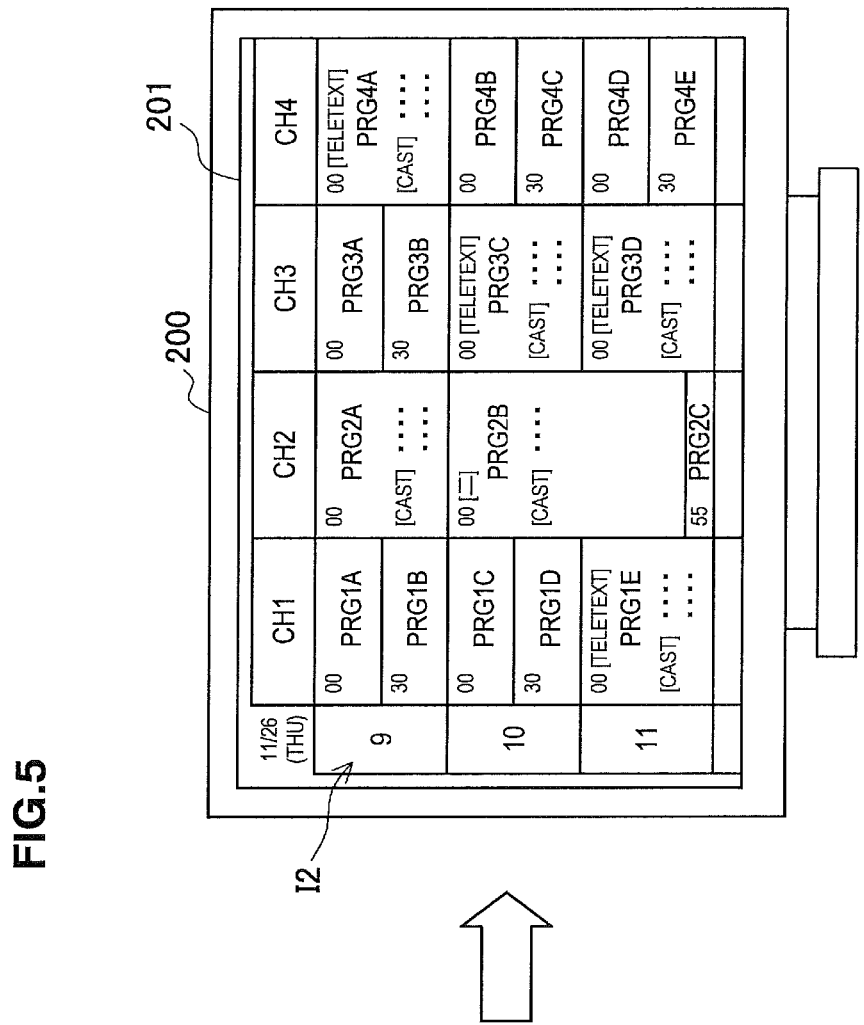
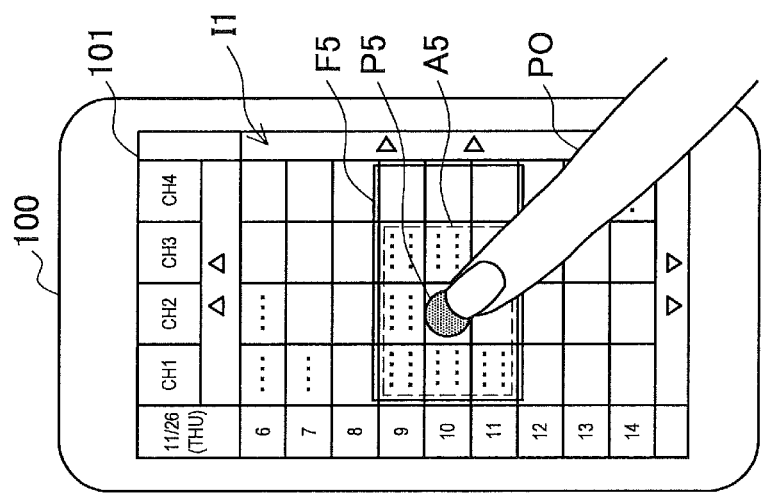

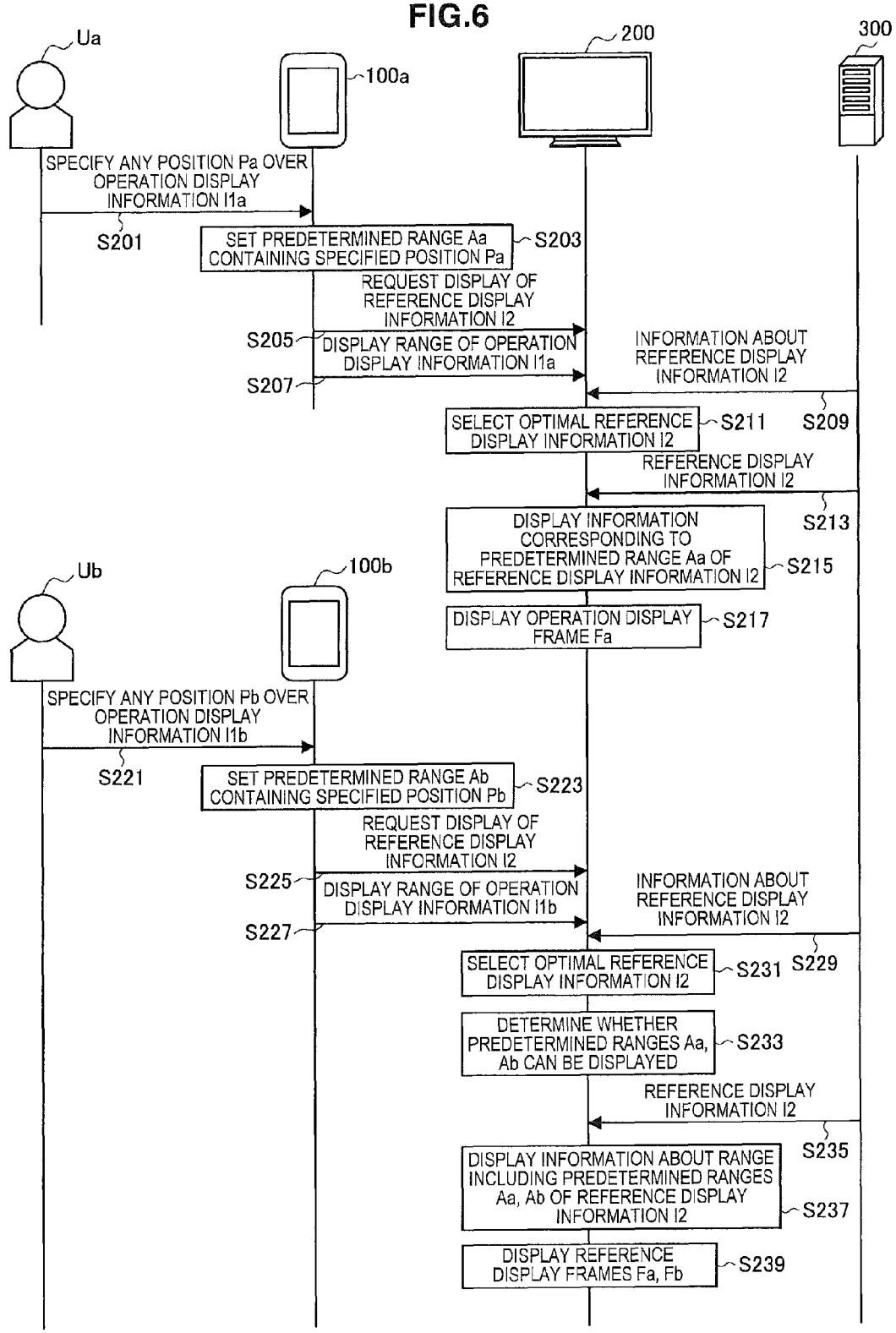

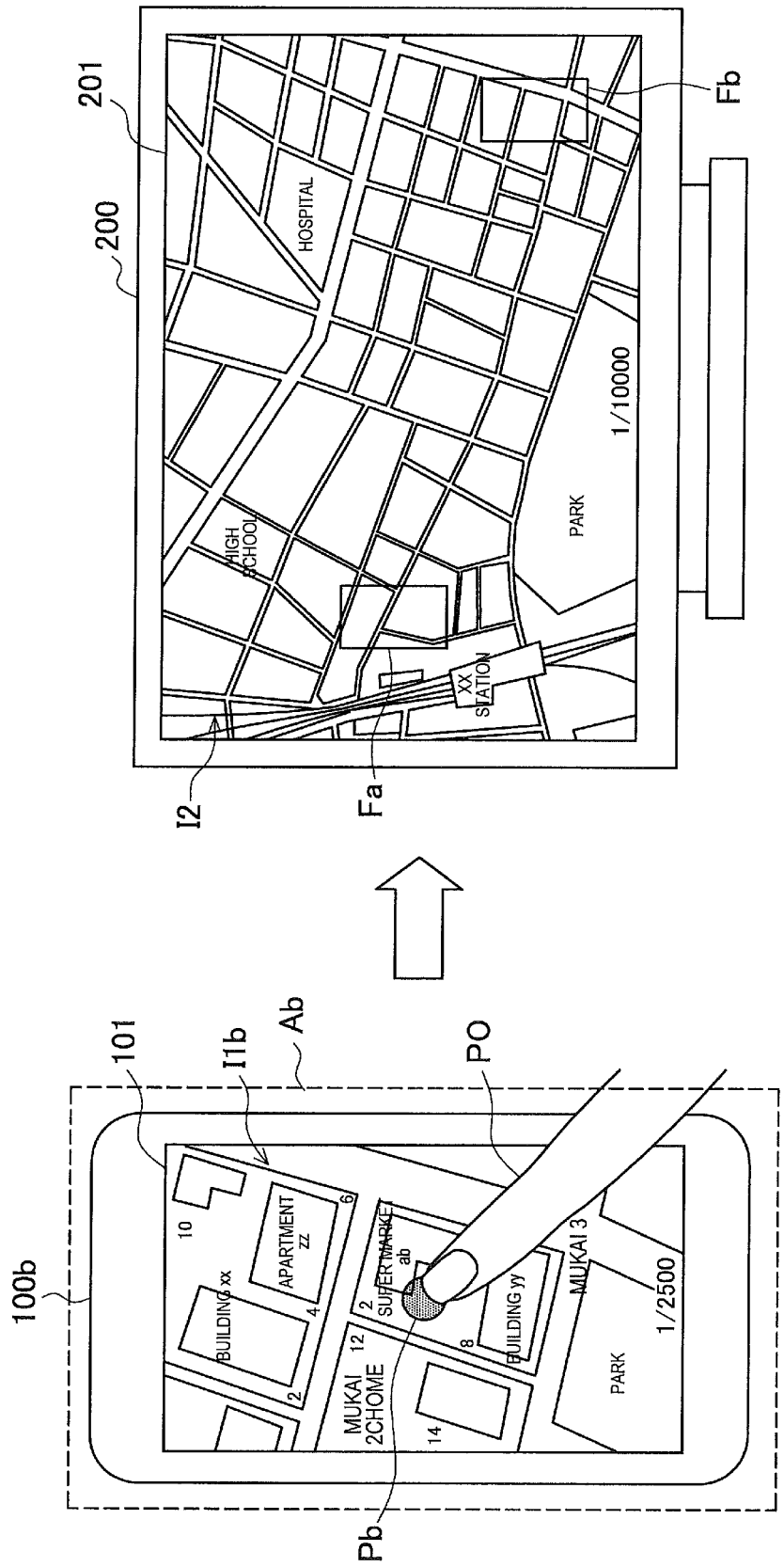

LINKED DISPLAY SYSTEM, LINKED DISPLAY METHOD AND PROGRAM

CROSS-REFERENCE TO RELATED APPLICATION

The present application is a national phase entry under 35 U.S.C. §371 of International Application No. PCT/JP2010/070378 filed Nov. 16, 2010, published on Jun. 30, 2011 as WO 2011/077859 A1, which claims priority from Japanese Patent Application No. JP 2009-296063 filed in the Japanese Patent Office on Dec. 25, 2009.

TECHNICAL FIELD

The present invention relates to a linked display system, a linked display method, and a program.

BACKGROUND ART

Applications or services such as the map information display and program information display have been used through mobile terminals. The size of a display area in the mobile terminal is limited to guarantee portability of the apparatus.

SUMMARY OF INVENTION

Technical Problem

The user has, however, a desire to use overview information and detailed information having different scales and amounts of information at the same time such as wide-area and detailed map information and overview and detailed program information through the mobile terminal. However, depending on applications or services, information having different scales and amounts of information may not be available at the same time for reasons such as the limited size of the display area. In such a case, for example, the user have to search for desired information by switching the display of information having different scales and amounts of information like from detailed information to overview information and further from overview information to detailed information, leading to a complicated operation being forced.

The present invention provides a linked display system capable of improving availability of information having different scales and amounts of information, a linked display method, and a program.

Solution to Problem

According to an aspect of the present invention, a linked display system having first and second display apparatuses is provided. The first display apparatus includes a first display unit that displays operation display information, a range setting unit that sets a predetermined range containing a specified position in accordance with an operation to specify any position over the operation display information, and a first communication unit that transmits the predetermined range to the second display apparatus. The second display apparatus includes a second communication unit that receives the predetermined range from the first display unit, a display information selection unit that selects the reference display information capable of displaying information corresponding to the predetermined range from at least one piece of reference display information corresponding to the operation display information in accordance with display capacity of a local apparatus and having a different scale and amount of information from the scale and amount of information of the operation display information, and a second display unit that displays the information corresponding to the predetermined range of the selected reference display information.

According to the above configuration, by specifying any position over the operation display information displayed in the first display apparatus, the user can use, together with the operation display information, the reference display information corresponding to the predetermined range containing the specified position and displayed in the second display apparatus as display information having a different scale and amount of information from those of the operation display information in an optimal state.

The range setting unit may set a range that contains the specified position and is narrower than the operation display information displayed in the first display unit as the predetermined range.

The first communication unit may receive a display range of the reference display information displayed in the second display unit from the second display unit and the first display unit may display a reference display frame indicating the display range of the reference display information by superimposing the reference display frame on the operation display information.

The range setting unit may set a range indicated by the reference display frame after movement in accordance with the operation to move the reference display frame on the first display unit as the predetermined range.

The range setting unit may set a range indicated by the reference display frame after a change in accordance with the operation to change a size of the reference display frame on the first display unit as the predetermined range and the display information selection unit may select the reference display information capable of displaying the information corresponding to the predetermined range from at least the one piece of the reference display information in accordance with the display capacity of the local apparatus and having the different scale and amount of information from the scale and amount of information of the operation display information.

The range setting unit may set the predetermined range containing the specified position in accordance with the operation to change the scale of the operation display information on the first display unit and the display information selection unit may select the reference display information capable of displaying the information corresponding to the predetermined range from at least the one piece of the reference display information in accordance with the display capacity of the local apparatus and having the different scale and amount of information from the scale and amount of information of the operation display information.

The range setting unit may set a range that contains the specified position and is wider than the operation display information displayed in the first display unit as the predetermined range.

The second communication unit may receive a display range of the operation display information displayed in the first display unit from the first display unit and the second display unit may display an operation display frame indicating the display range of the operation display information by superimposing the operation display frame on the reference display information.

The second communication unit may receive the predetermined range containing any position specified over the operation display information from each of a plurality of the first display apparatuses, the display information selection unit selects the reference display information capable of displaying the information containing the information corresponding to the plurality of predetermined ranges from at least the one piece of the reference display information corresponding to the operation display information in accordance with the display capacity of the local apparatus and having the different scale and amount of information from the scale and amount of information of the operation display information, and the second display unit may display the information containing the information corresponding to the plurality of predetermined ranges of the selected reference display information.

The first display apparatus may request the second display apparatus to activate an application or start to use a service capable of displaying the reference display information and in response to the request of activation, the second display apparatus may activate the application or start to use the service capable of displaying the reference display information.

According to another aspect of the present invention, there is provided a linked display method including the steps of transmitting a predetermined range containing a specified position in accordance with an operation to specify any position over operation display information displayed on a local apparatus to a second display apparatus by a first display apparatus, selecting the reference display information capable of displaying information corresponding to the predetermined range from at least one piece of reference display information corresponding to the operation display information in accordance with display capacity of a local apparatus and having a different scale and amount of information from the scale and amount of information of the operation display information by the second display apparatus, and displaying the information corresponding to the predetermined range of the selected reference display information by the second display apparatus.

According to still another aspect of the present invention, there is provided a program causing a computer to execute the above linked display method. The program may be provided by using a computer readable recording medium or via a means of communications.

Advantageous Effects of Invention

According to the present invention, as described above, a linked display system capable of improving availability of information having different scales and amounts of information, a linked display method, and a program can be provided.

BRIEF DESCRIPTION OF DRAWINGS

FIG. 3 is a sequence diagram showing an operation of the linked display system.
FIG. 4A is a diagram (1/4) showing a map information display by the linked display system.
FIG. 4B is a diagram (2/4) showing the map information display by the linked display system.
FIG. 4C is a diagram (3/4) showing the map information display by the linked display system.
FIG. 4D is a diagram (4/4) showing the map information display by the linked display system.
FIG. 5 is a diagram showing an example of a program information display by the linked display system.
FIG. 6 is a sequence diagram showing a modification of the operation of the linked display system.
FIG. 7B is a diagram (2/2) showing the modification of the map information display by the linked display system.

DESCRIPTION OF EMBODIMENT

Figure 1:
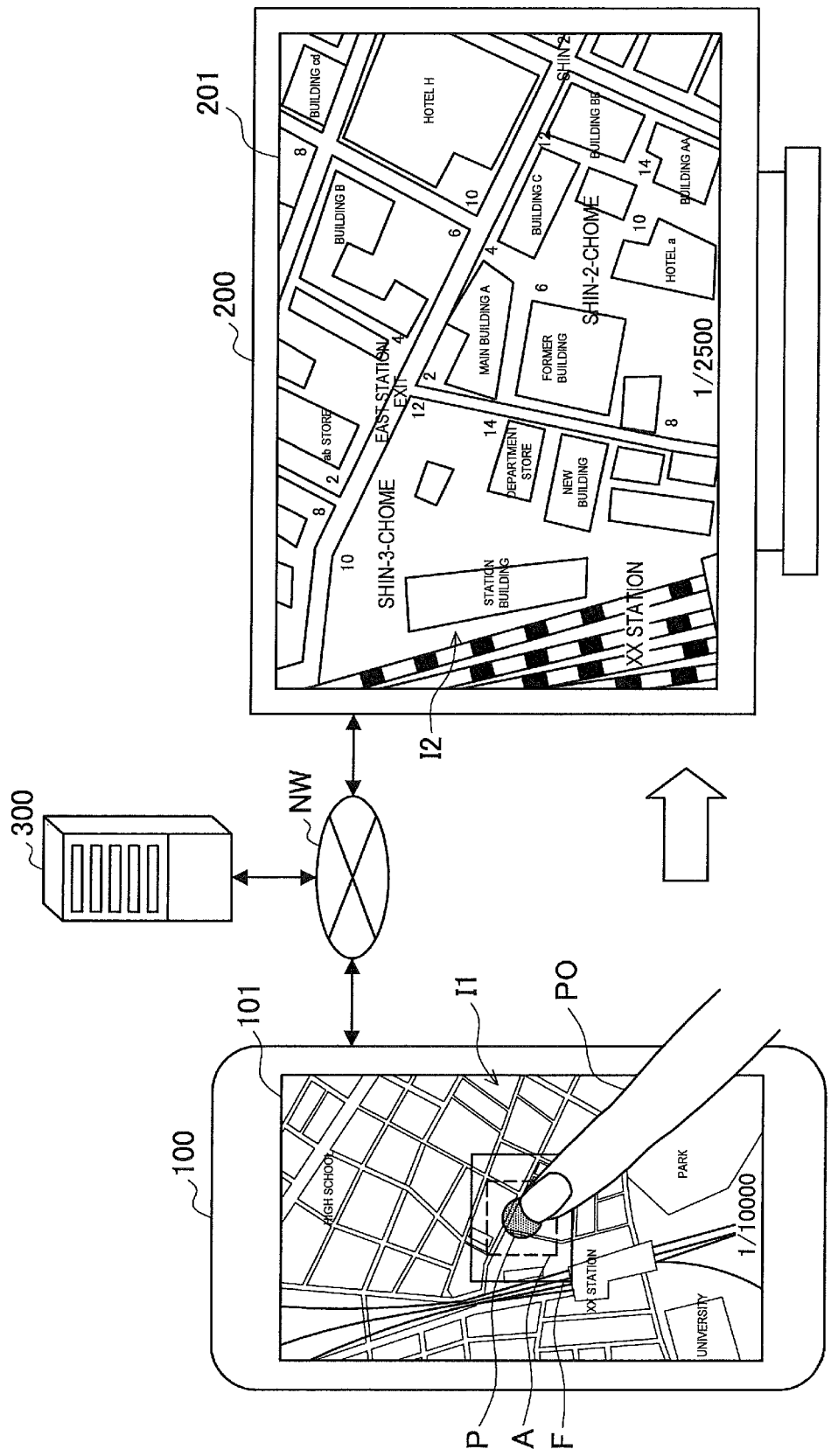
FIG. 1 is a diagram showing an overview of a linked display system according to the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[1. Overview of Linked Display System]

First, an overview of a linked display system according to the present invention will be provided with reference to FIG. 1.

As shown in FIG. 1, the linked display system includes a mobile terminal 100, a TV set 200, and a service server 300.

The mobile terminal 100 is a first display apparatus such as a commander having a touch panel function, mobile phone, or PDA. The TV set 200 is an example of a second display apparatus including a TV set, personal computer, projector, and car navigator. The service server 300 is an example of a server apparatus providing services such as provisioning of display information.

The mobile terminal 100 and the TV set 200 perform two-way communication via a wire or wireless communication line. The mobile terminal 100 and the TV set 200 perform two-way communication via a network NW or without the aid of the network NW. The mobile terminal 100 and the TV set 200 perform two-way communication with the service server 300 via the network NW. The mobile terminal 100 and the TV set 200 link and display display information I1, I2 of the map information display and program information display. The mobile terminal 100 may be configured as a commander that remotely operates the TV set 200.

The mobile terminal 100 receives and displays operation display information I1 (for example, map information on some scale) from the service server 300. If a user U specifies any position P over the operation display information I1 by a finger PO, stylus or the like, the mobile terminal 100 sends a predetermined range A containing the specified position to the TV set 200. Incidentally, the operation display information I1 may be received from the TV set 200 or held in the mobile terminal 100.

The TV set 200 selects optimal reference display information I2 (for example, map information on another scale) from one or more pieces of the reference display information I2 corresponding to the operation display information I1. Then, the TV set 200 receives the selected reference display information I2 from the service server 300 and displays information corresponding to the predetermined range A of the received reference display information I2. Incidentally, the operation display information I2 may be received from the mobile terminal 100 or held in the TV set 200.

The optimal reference display information I2 is selected as the reference display information I2 capable of displaying information corresponding to the predetermined range A in accordance with display capacity of the TV set 200 and having a different scale and amount of information from those of the operation display information I1. The mobile terminal 100 displays a reference display frame F indicating a display range of the reference display information I2 displayed in the TV set 200.

Accordingly, by specifying any position P over the operation display information I1, the user U can use, together with the operation display information I1, the reference display information I2 corresponding to the predetermined range A containing the specified position P and displayed in the TV set 200 as display information having a different scale and amount of information from those of the operation display information I1 in an optimal state.

[2. Configuration of Linked Display System]

Figure 2:
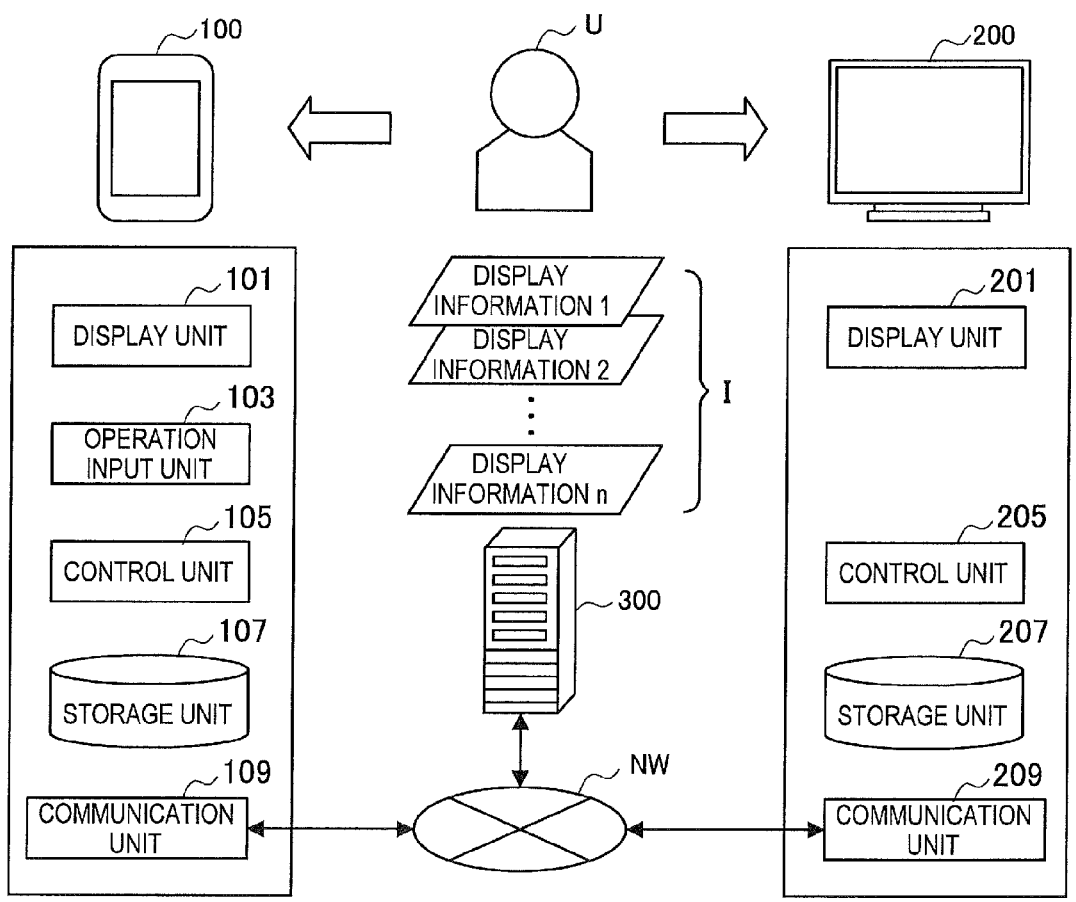
FIG. 2 is a block diagram showing a main functional configuration of the linked display system.

Next, the configuration of a linked display system will be described with reference to FIG. 2. FIG. 2 shows a main functional configuration of the linked display system.

As shown in FIG. 2, the mobile terminal 100 includes a display unit 101, an operation input unit 103, a control unit 105, a storage unit 107, and a communication unit 109.

The display unit 101 and the operation input unit 103 are configured, for example, as a touch panel display. The display unit 101 displays the operation display information I1 such as map information and program information. The operation input unit 103 detects operation input to a panel surface. The control unit 105 includes a CPU, RAM. and ROM and the CPU executes programs stored in the ROM by using the RAM as a work memory to control each unit of the mobile terminal 100. The control unit 105 also functions as a range setting unit. The storage unit 107 is a nonvolatile memory such as an EEPROM and stores device information of peripheral units, setting information of the predetermined range A, execution data/acquisition source information of applications, display data, and command information. The communication unit 109 transmits/receives various kinds of data/commands between peripheral units such as the TV set 200 and the service server 300.

The control unit 105 controls the communication unit 109 and the display unit 101 so that the operation display information I1 is received and displayed. If operation input specifying any position P over the operation display information I1 is detected, the control unit 105 sets the predetermined range A containing the specified position P and controls the communication unit 109 so that the predetermined range A is transmitted to the TV set 200.

As shown in FIG. 2, the TV set 200 includes a display unit 201, a control unit 205, a storage unit 207, and a communication unit 209.

The display unit 201 displays the reference display information I2 such as map information and program information. The control unit 205 is configured in the same manner as the control unit 105 and executes programs to control each unit of the TV set 200. The control unit 205 also functions as a display information selection unit. The storage unit 207 is configured in the same manner as the storage unit 107 and stores display data, command information and the like. The communication unit 209 transmits/receives various kinds of data/commands between peripheral units such as the mobile terminal 100 and the service server 300.

The control unit 205 controls the communication unit 209 so that information about at least one piece of the reference display information I2 corresponding to the operation display information I1 is received from the service server 300 and selects the optimal reference display information I2 based on the received information. Then, the control unit 205 receives the selected reference display information I2 and controls the communication unit 209 and the display unit 201 so that information corresponding to the predetermined range A of the reference display information I2 is displayed.

As shown in FIG. 2, the service server 300 manages display information I (the operation display information I1 and the reference display information I2) having different scales and amounts of information. The display information I may be prepared separately for an operation use and a reference use or prepared to be usable for both uses. The service server 300 provides the specified display information I to the mobile terminal 100 and the TV set 200 in response to a transmission request of the display information I.

[3. Operation of Linked Display System]

Next, the operation of a linked display system will be described with reference to FIGS. 3, 4A to 4D, and 5.

FIG. 3 shows a sequence diagram showing the operation of the linked display system. It is assumed here that the mobile terminal 100 has an application capable of executing a linked display function with the TV set 200 activated thereon.

As shown in FIG. 3, if the user U instructs the display by specifying the operation display information I1 (step S101), the mobile terminal 100 requests the transmission of the specified operation display information I1 from the service server 300 (S103). The service server 300 selects and transmits the specified operation display information I1 to the mobile terminal 100 in response to the transmission request (S105) and the mobile terminal 100 displays the received operation display information I1 (S107).

If the user U instructs the execution of the linked display function (S109), the mobile terminal 100 determines whether the TV set 200 can execute the same application or a corresponding application (S111). Whether the application is executable is determined based on device information received from the TV set 200 or the service server 300 and/or device information held in the mobile terminal 100.

If an affirmative determination result is obtained, the mobile terminal 100 requests the TV set 200 to activate the application (S113). The mobile terminal 100 may transmit executable data of the application or make a notification of address in a network NW from which the application can be acquired. The TV set 200 activates the same application or a corresponding application in response to the activation request (S115) and notifies the mobile terminal 100 of the completion of activation (S117).

If the user U specifies any position P over the operation display information I1 on the touch panel (S119), the mobile terminal 100 sets the predetermined range A containing the specified position P (S121). The specified position P indicates, for example, the longitude/latitude (reference position) corresponding to the contact position on the touch panel regarding map information or the channel/time (reference position) corresponding to the contact position on the touch panel regarding program information.

The predetermined range A is set as a range around the specified position P. The predetermined range A is set, for example, as a range having predetermined longitude/latitude differences around the reference position regarding map information or as a range having predetermined channel/time differences around the reference position regarding program information. The predetermined range A may be set by making adjustments in accordance with the scale and amount of information of the operation display information I1 displayed in the mobile terminal 100 or fixedly regardless of the scale and amount of information of the operation display information I1.

The predetermined range A contains the specified position P and is set as a range narrower than the operation display information I1 displayed in the mobile terminal 100. Incidentally, the predetermined range A is set as a range wider than the operation display information I1 displayed in the mobile terminal 100 in a modification described later.

After the predetermined range A being set, the mobile terminal 100 requests the TV set 200 to display the reference display information I2 (S123). The display request involves identification information of the operation display information I1 and the predetermined range A.

In response to the display request, the TV set 200 requests the transmission of information about the reference display information I2 from the service server 300 (S125). In response to the transmission request, the service server 300 selects at least one piece of the reference display information I2 corresponding to the operation display information I1 based on information accompanying the display request and transmits information about the selected reference display information I2 to the TV set 200 (S127).

In response to reception of information, the TV set 200 selects the optimal reference display information I2 from at least one piece of the reference display information I2 corresponding to the operation display information I1 (S129). Then, the TV set 200 specifies the selected reference display information I2 and request the transmission of the reference display information I2 from the service server 300 (S131). The service server 300 selects and transmits the specified reference display information I2 to the TV set 200 (S133) and the TV set 200 displays information corresponding to the predetermined range A of the received reference display information I2 (S135). The information corresponding to the predetermined range A contains at least information about the predetermined range A and may also contain information about a periphery thereof or may be, in some cases, partial information of information about the predetermined range A.

The availability of the reference display information I2 having mutually different scales or amounts of information depends on the application or service. The display capacity of the TV set 200 also depends on performance of each apparatus. Thus, the optimal reference display information I2 is selected as the reference display information I2 capable of displaying information corresponding to the predetermined range A in accordance with display capacity of the TV set 200 and having a different scale and amount of information from those of the operation display information I1.

When the reference display information I2 is displayed, the TV set 200 transmits the display range of the reference display information I2 to the mobile terminal 100 (S137) and the mobile terminal 100 superimposes and displays a reference display frame F showing the display range of the reference display information I2 on the operation display information I1 (S139).

FIGS. 4A to 4D show examples of the map information display by a linked display system. A case when map information on scales of $1/25000$, $1/10000$, $1/5000$, and $1/2500$ is available as the operation display information I1 and the reference display information I2 is assumed below.

In the example shown in FIG. 4A, map information on a scale of $1/10000$ is displayed as the operation display information I1. Then, a predetermined range A1 containing a position P1 specified by a tap operation is set in accordance with the tap operation by a finger PO over the operation display information I1.

The specified position (reference position) P1 is (Lng0: longitude, Lat0: latitude) and the predetermined range A1 is set as (Lng0±ΔLng0/2, Lat0±ΔLat0/2). The predetermined range A is set here as a range narrower than the operation display information I1 displayed in the mobile terminal 100.

ΔLng0 and ΔLat0 denote longitude/latitude differences used to set the predetermined range A1 around the reference position P1.

It is assumed here that information corresponding to the predetermined range A1 can appropriately be displayed by the display capacity defined by the resolution or screen size of the TV set 200 using map information on a scale of $1/2500$, but cannot appropriately be displayed using map information on a scale of $1/5000$. In this case, map information on a scale of $1/2500$ is selected as the reference display information I2. Then, information corresponding to the predetermined range A1 and a periphery thereof of the reference display information I2 is displayed. In the mobile terminal 100, a reference display frame F1 indicating the display range of the reference display information I2 is displayed by being superimposed on the operation display information I1.

In the example shown in FIG. 4B, the reference display frame F1 is moved in accordance with a drag operation by the finger PO specifying the whole reference display frame F1 and the range indicated by a reference display frame F2 after the movement is set as a predetermined range A2. The predetermined range A2 is set as (Lng1±ΔLng0/2, Lat1±ΔLat0/2) in accordance with the change from the reference position P1 (Lng0, Lat0) to a reference position P2 (Lng1, Lat1).

Because information corresponding to the range indicated by the reference display frame F2 after the movement can appropriately be displayed by the display capacity of the TV set 200 using map information on a scale of $1/2500$, the map information on a scale of $1/2500$ is selected as the reference display information I2. Then, information of the range indicated by the reference display frame F2 after the movement of the reference display information I2 is displayed.

In the example shown in FIG. 4C, the reference display frame F1 is enlarged in accordance with a drag operation by the finger PO specifying a corner of the reference display frame F1 and the range indicated by a reference display frame F3 after the enlargement is set as a predetermined range A3. The predetermined range A3 is set as (Lng0±ΔLng1/2, Lat0±ΔLat1/2) in accordance with the enlargement from the reference display frame F1 to the reference display frame F3. ΔLng1 and ΔLat1 are used to set the range indicated by the reference display frame F3 around the reference position P1 (Lng0, Lat0).

It is assumed here that information corresponding to the range indicated by the reference display frame F3 after the enlargement can appropriately be displayed by the display capacity of the TV set 200 using map information on a scale of $1/5000$, but cannot appropriately be displayed using map information on a scale of $1/2500$. In this case, map information on a scale of $1/5000$ is selected as the reference display information I2. Then, information of the range indicated by the reference display frame F3 after the enlargement of the reference display information I2 is displayed.

In the example shown in FIG. 4D, the scale of the operation display information I1 is changed in accordance with an option operation over the operation display information I1 and map information on a scale of $1/25000$ is displayed as the operation display information I1. In this case, a predetermined range A4 containing the position P1 of information specified by a previous tap operation is set. The predetermined range A4 is set as (Lng0±ΔLng2/2, Lat0±ΔLat2/2) in accordance with the change of scale of the operation display information I1. ΔLng2 and ΔLat2 are used to set the range indicated by the reference display frame F4 around the reference position P1 (Lng0, Lat0).

It is assumed here that information corresponding to the predetermined range A4 after the scale change can appropriately be displayed by the display capacity of the TV set 200 using map information on a scale of 1/5000, but cannot appropriately be displayed using map information on a scale of 1/2500. In this case, map information on a scale of 1/5000 is selected as the reference display information I2. Then, information corresponding to the predetermined range A4 and a periphery thereof of the reference display information I2 is displayed. The reference display frame F4 indicating the display range of the reference display information I2 is displayed by being superimposed on the operation display information.

FIG. 5 shows an example of a program information display by the linked display system. It is assumed below that overview program information and detailed program information exist as the operation display information I1 and the reference display information I2. The overview program information is list information showing program information of a plurality of channels and the detailed program information is information obtained by adding information such as a program description to the overview program information.

In the example shown in FIG. 5, overview program information is displayed as the operation display information I1. Then, a predetermined range A5 containing a position P5 specified by a tap operation is set in accordance with the tap operation by the finger PO over the operation display information I1. The reference position P5 is (channel 2, November 26, 1000 hours) and the predetermined range A5 is set as (channel 2±one channel, November 26, 1000 hours±one hour). ±one channel and ±one hour denote channel and time differences used to set the predetermined range A5 around the reference position P5 (channel 2, November 26, 1000 hours).

It is assumed here that information corresponding to the predetermined range A5 can appropriately be displayed by the display capacity of the TV set 200 using detailed program information. In this case, the detailed program information is selected as the reference display information I2. Then, information corresponding to the predetermined range A5 and a periphery thereof of the reference display information I2 is displayed. In the mobile terminal 100, a reference display frame F5 indicating the display range of the reference display information I2 is displayed by being superimposed on the operation display information I1.

[4. Modification of Operation of Linked Display System]

Next, a modification of the operation of the linked display system will be described with reference to FIGS. 6, 7A, and 7B. A repeated description of the operation of the above linked display system is omitted.

FIG. 6 shows a sequence diagram showing the operation of the linked display system. It is assumed here that an application capable of executing a linked display function with the TV set 200 is activated in mobile terminals 100*a*, 100*b* of users Ua, Ub and operation display information I1*a*, I1*b* is displayed in the mobile terminals 100*a*, 100*b* respectively.

If, as shown in FIG. 6, the user Ua specifies any position Pa over the operation display information I1*a* on the touch panel (step S201), the mobile terminal 100*a* sets a predetermined range Aa containing the specified position Pa (S203). The predetermined range Aa is set here as a range wider than the operation display information I1*a* displayed in the mobile terminal 100*a*. After the predetermined range Aa being set, the mobile terminal 100*a* requests the TV set 200 to display the reference display information I2 together with the display range of the operation display information I1*a* displayed in the local apparatus (S205, S207).

In response to the display request from the mobile terminal 100*a*, the TV set 200 receives information about the reference display information I2 from the service server 300 (S209) and selects the optimal reference display information I2 from at least one piece of the reference display information I2 corresponding to the operation display information I1*a* (S211). Then, the TV set 200 receives the selected reference display information I2 from the service server 300 (S213) and displays information corresponding to the predetermined range Aa of the received reference display information I2 (S215). The TV set 200 displays a reference display frame Fa indicating the display range of the operation display information I1*a* by superimposing the reference display frame Fa on the reference display information I2 (S217).

Next, if the user Ub specifies any position Pb over the operation display information I1*b* on the touch panel (S221), the mobile terminal 100*b* sets a predetermined range Ab containing the specified position Pb (S223). After the predetermined range Ab being set, the mobile terminal 100*b* requests the TV set 200 to display the reference display information I2 together with the display range of the operation display information I1*b* displayed in the local apparatus (S225, S227).

In response to the display request from the mobile terminal 100*b*, the TV set 200 receives information about the reference display information I2 from the service server 300 (S229) and selects the optimal reference display information I2 from at least one piece of the reference display information I2 corresponding to the operation display information I1*b* (S231). Then, the TV set 200 determines whether the display ranges of the operation display information I1*b*, I1*b* can appropriately be displayed over the common reference display information I2 (S233).

If the display ranges can be displayed over the reference display information I2 displayed in the local apparatus or the display ranges can be displayed in an appropriate size by using the reference display information I2 wider than the displayed reference display information I2, the TV set 200 obtains an affirmative determination result.

If an affirmative determination result is obtained, the TV set 200 receives the reference display information I2 again to update the display if necessary (S235, S237) and then, displays the reference display frames Fa, Fb indicating the display ranges of the operation display information I1*a*, I1*b* by superimposing the reference display frames Fa, Fb on the reference display information I2 (S239). On the other hand, if a negative determination result is obtained, the TV set 200 notifies the mobile terminal 100*b* that the display range of the operation display information I1*b* cannot be displayed.

Figure 7A:
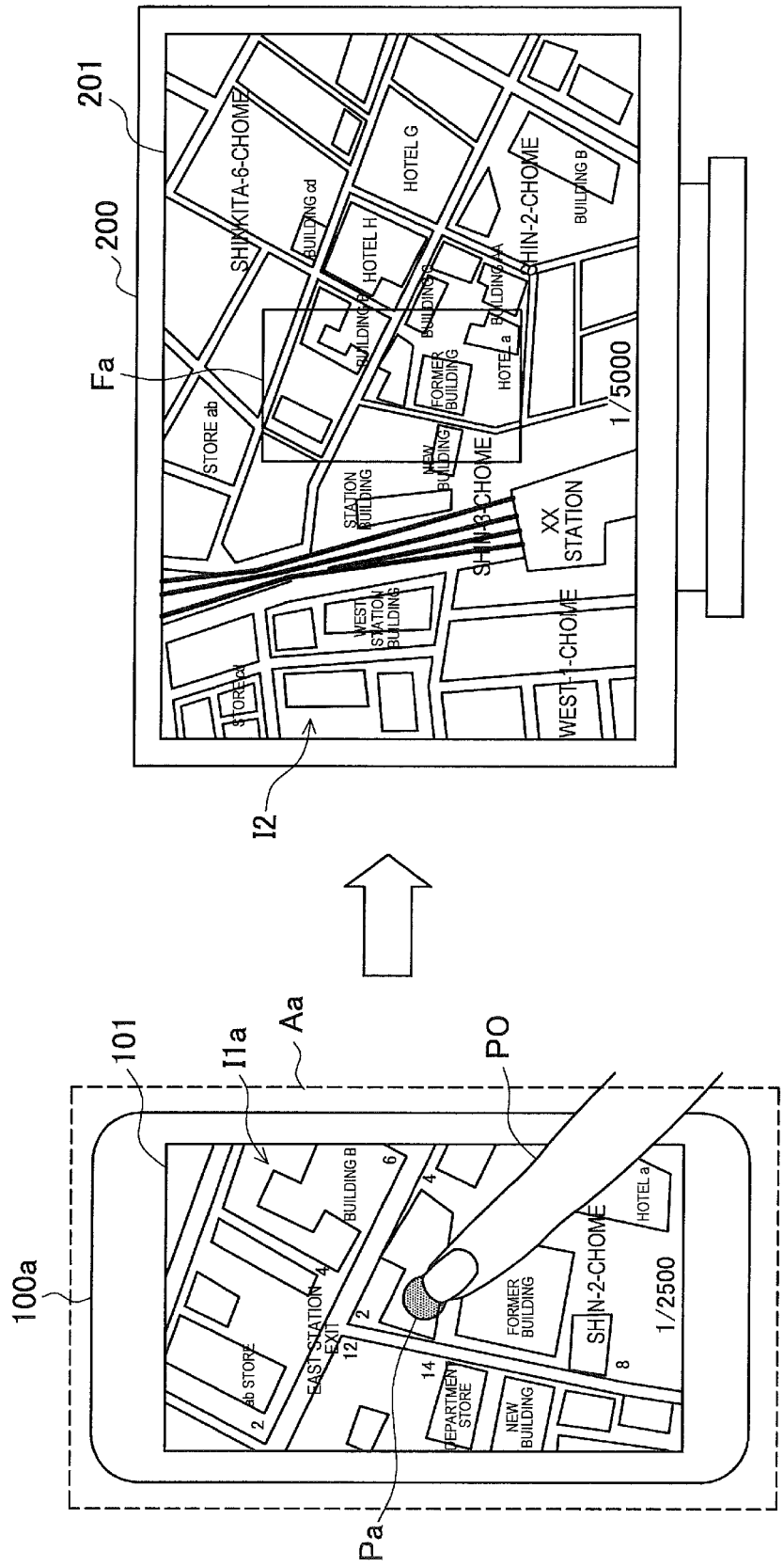
FIG. 7A is a diagram (1/2) showing a modification of the map information display by the linked display system.

FIGS. 7A and 7B show a modification of the map information display by the linked display system.

In the example shown in FIGS. 7A and 7B, map information on a scale of 1/2500 is displayed as the operation display information I1*a*, I1*b*. First, as shown in FIG. 7A, the mobile terminal 100*a* sets the predetermined range Aa containing the position Pa specified by a tap operation in accordance with the tap operation over the operation display information I1*a*. The predetermined range Aa is set as (LngA±ΔLngA/2, LatA±ΔLatA/2). The predetermined range Aa is set here as a range wider than the operation display information I1*a* displayed in the mobile terminal 100.

It is assumed here that information corresponding to the predetermined range Aa can appropriately be displayed by the display capacity of the TV set 200 using map information on a scale of 1/5000. In this case, map information on a scale of 1/5000 is selected as the reference display information I2. Then, information corresponding to the predetermined range Aa and a periphery thereof of the reference display information I2 is displayed. In addition, the reference display frame Fa indicating the display range of the operation display information I1a displayed in the mobile terminal 100a is displayed by being superimposed on the reference display information I2.

Next, as shown in FIG. 7B, the mobile terminal 100b sets the predetermined range Ab containing the position Pb specified by a tap operation in accordance with the tap operation over the operation display information I1b. The predetermined range Ab is set as (LngB±ΔLngB/2, LatB±ΔLatB/2).

It is assumed here that information corresponding to the predetermined range Ab can appropriately be displayed by the display capacity of the TV set 200 using map information on a scale of 1/5000, but the display ranges of both pieces of the operation display information I1a, I1b cannot be displayed on the map information on a scale of 1/5000. In this case, map information on a scale of 1/10000 is selected as the reference display information I2. Then, after the display of the reference display information I2 being updated, the reference display frames Fa, Fb indicating the display ranges of the operation display information I1a, I1b are displayed by being superimposed on the reference display information I2.

[5. Summary]

According to a linked display system in the embodiments of the present invention, as described above, by specifying any position P over the operation display information I1 displayed in the mobile terminal 100, the user U can use, together with the operation display information I1, the reference display information I2 corresponding to the predetermined range A containing the specified position P and displayed in the TV set 200 as display information having a different scale and amount of information from those of the operation display information I1 in an optimal state.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

In the above description, for example, a case when information such as an activation request of an application, a display request of the reference display information I2, and a display range of the reference display information I2 is transmitted and received between the mobile terminal 100 and the TV set 200 is described. However, such information may be transmitted and received between the mobile terminal 100 and the TV set 200 via the service server 300.

Also in the above description, a case when the mobile terminal 100 receives the operation display information I1 from the service server 300 and the TV set 200 receives the reference display information I2 from the service server 300 is described. However, the mobile terminal 100 may receive the operation display information I1 from the TV set 200 or hold the operation display information I1 in the local apparatus. Similarly, the TV set 200 may receive the operation display information I2 from the mobile terminal 100 or hold the operation display information I2 in the local apparatus.

Also in the above description, a case when the operation display information I1 is map information is described. However, the operation display information I1 may be image information representing any location over map information.

Also in the above description, a case when the predetermined range A is set as a rectangular range around the position (reference position) P specified over the operation display information I1 is described. However, the predetermined range A may be set as a rectangular range with the reference position P as a vertex thereof or as a circular, elliptic, or polygonal range around the reference position P.

Also in the above description, a case when a user operation such as specifying any position P over the operation display information I1 is input through a touch panel is described. However, such a user operation may be input through an input device other than the touch panel such as a hardware button or jog dial.

The second display apparatus may be a portable display apparatus such as the portable TV set 200 and a car navigator. In this case, by carrying the mobile terminal 100 and the portable display apparatus, the user U can use the operation display information I1 and the reference display information I2 while moving.

REFERENCE SIGNS LIST 100, 100a, 100b Mobile terminal
200 TV set
300 Service server
101, 201 Display unit
103 Operation input unit
105, 205 Control unit
107, 207 Storage unit
109, 209 Communication unit
I1 Operation display information
I2 Reference display information
F Operation/reference display frame

The invention claimed is:

1. A linked display system comprising first and second display apparatuses,
wherein the first display apparatus includes:
a first display device that displays operation display information;
an input device that enables a user to specify any position on the operation display information displayed on the first display device;
a range setting device that sets a predetermined range containing the specified position in response to the user specifying the specified position without further input from the user; and
a first communication device that transmits the predetermined range to the second display apparatus, and
the second display apparatus includes:
a second communication device that receives the predetermined range from the first display device;
a display information selection device that selects reference display information capable of displaying information corresponding to the predetermined range from at least one piece of reference display information corresponding to the operation display information in accordance with display capacity and having a different scale and amount of information from the scale and amount of information of the operation display information; and
a second display device that displays the information different from the predetermined range of the selected reference display information in accordance with display capacity,
the first communication device being arranged to receive a display range of the reference display information displayed in the second display device from the second display device and the first display device being arranged to display thereon a reference display frame indicating the display range of the reference display information by superimposing the reference display frame on the operation display information,
in which the range setting device sets a size of the predetermined range in accordance with an amount of information currently being displayed on the first display device in response to the user specifying the specified position without further input from the user, and in which a size of the display range of the reference display information is larger than the size of the predetermined range set by the range setting device and the size of the predetermined range is less than a size of a range of the displayed operation display information.

2. The linked display system according to claim 1, wherein the range setting device sets a range indicated by the reference display frame after movement in accordance with the operation to move the reference display frame on the first display device as the predetermined range.

3. The linked display system according to claim 1, wherein the first display apparatus requests the second display apparatus to activate an application or start to use a service capable of displaying the reference display information, and the second display apparatus activates the application or starts to use the service capable of displaying the reference display information in response to the request of activation.

4. The linked display system according to claim 1, in which the range setting device sets the predetermined range as a rectangle with the specified position as a center thereof and lengths of the rectangle are set based on predetermined lengths and the specified position.

5. The linked display system according to claim 1, in which the range setting device sets the predetermined range as a rectangle with the specified position as a vertex thereof and lengths of the rectangle are set based on predetermined lengths and the specified position.

6. The linked display system according to claim 1, in which the range setting device sets the predetermined range as a circle with the specified position as a center thereof and with a predetermined radius.

7. A linked display method, comprising:

specifying a position by a user from any position on operation display information displayed on a first display device of a first display apparatus;

setting a predetermined range containing the specified position by use of a control device in response to the user specifying the specified position without further input from the user, in which a size of the predetermined range is set in accordance with an amount of information currently being displayed on the first display device in response to the user specifying the specified position without further input from the user;

transmitting the predetermined range to a second display apparatus by the first display apparatus;

selecting reference display information capable of displaying information corresponding to the predetermined range from at least one piece of reference display information corresponding to the operation display information in accordance with display capacity and having a different scale and amount of information from the scale and amount of information of the operation display information by the second display apparatus;

displaying the information different from the predetermined range of the selected reference display information in accordance with display capacity by the second display apparatus;

receiving at the first display apparatus a display range of the reference display information displayed in the second display apparatus from the second display apparatus; and displaying on the first display apparatus a reference display frame indicating the display range of the reference display information by superimposing the reference display frame on the operation display information, in which a size of the display range of the reference display information is larger than the size of the set predetermined range and the size of the predetermined range is less than a size of a range of the displayed operation display information.

8. A non-transitory computer readable medium having stored thereon a program causing a computer to execute a linked display method, the method comprising:

enabling a user to specify any position on operation display information displayed on a first display device of a first display apparatus;

setting a predetermined range containing the specified position by use of a control device in response to the user specifying the specified position without further input from the user, in which a size of the predetermined range is set in accordance with an amount of information currently being displayed on the first display device in response to the user specifying the specified position without further input from the user;

transmitting the predetermined range to a second display apparatus by the first display apparatus selecting reference display information capable of displaying information corresponding to the predetermined range from at least one piece of reference display information corresponding to the operation display information in accordance with display capacity and having a different scale and amount of information from the scale and amount of information of the operation display information by the second display apparatus;

displaying the information different from the predetermined range of the selected reference display information in accordance with display capacity by the second display apparatus;

receiving at the first display apparatus a display range of the reference display information displayed in the second display apparatus from the second display apparatus; and displaying on the first display apparatus a reference display frame indicating the display range of the reference display information by superimposing the reference display frame on the operation display information, in which a size of the display range of the reference display information is larger than the size of the set predetermined range and the size of the predetermined range is less than a size of a range of the displayed operation display information.

* * * * *